Patented June 20, 1944

2,351,641

UNITED STATES PATENT OFFICE 2,351,641

CEMENTITIOUS MATERIAL

William E. Sohl and Henry N. Stephens, White Bear Lake, Minn., assignors to Minnesota Mining & Manufacturing Company, St. Paul, Minn., a corporation of Delaware No Drawing. Application October 2, 1939, Serial No. 297,502

11 Claims. (Cl. 106—106)

The present invention relates to cementitious compositions and especially to magnesium oxychloride cements, or to compositions comprising magnesium oxychloride and/or oxysulphate or the like.

Magnesium oxychloride and related basic salt cements, as heretofore made, have had certain disadvantages. For example they expand after solidifying with the result that they bulge or heave; also they weather poorly because they expand and disintegrate on continued wetting or soaking.

Efforts have been made to minimize these disadvantages of oxychloride cements and certain suggestions have been made with respect thereto. Perhaps one of the better known suggestions is that of using finely divided copper in admixture with the cement. Such suggestion is shown in various patents throughout the last twenty years or so.

One of the disadvantages of the use of copper powder in oxychloride and like cements is the high expense involved in using the same. Copper powder is expensive from at least three points of view: copper powder as such has a high cost per unit volume; secondly, a large percentage of copper is required, and, thirdly, the bulk of the cement is not appreciably increased by virtue of the addition of the copper powder. In addition to these disadvantages, copper powder gives the cement a colored or greenish appearance, which is undesirable for many purposes, and also fails to give other advantages of the present invention.

Other suggestions have also been made in connection with these types of cements but either they have the disadvantage of being too expensive to be economical or else they only partially or unsatisfactorily function in the intended manner.

It is an object of this invention to produce cementitious compositions of the nature of magnesium oxychloride cement, or the like, of improved characteristics in respect to tendency toward expanding upon hardening which often causes stresses to be set up which ruptures the bond between the cement and the underlying or adjoining surface, with a consequent heaving or bulging. Another object is to provide a cement composition of improved properties in respect to improved weathering characteristics including retardation of the normal tendency of magnesium oxychloride and like cements to disintegrate upon prolonged wetting. Another object of this invention is to produce a composition which is economical and can easily be prepared. A further object is to produce a cementitious composition which is free of discoloration and which can readily be made of a white or a neutral color, or can be colored to any desired shade. An additional object is to provide a cement in which commercial magnesias, which contain small amounts of free lime, and calcined dolomite, can be employed while still arriving at a cement which is resistant to expansion and is of good weathering properties. Another object is to provide a novel and improved cement, e. g. oxychloride cement, which may be employed for a larger number of industrial and commercial purposes, due to its characteristics, than cements of this general type heretofore manufactured. These and other objects and advantages will appear from the application taken as a whole.

One preferred embodiment of our invention comprises the addition to magnesium oxychloride cement compositions of difficulty soluble salts of higher acids of phosphorous and certain related elements, such as phosphates or acid phosphates which are difficulty soluble in water, for example phosphates or secondary phosphates of metals such as calcium and/or other alkaline earth metals, magnesium, aluminum, and copper. The secondary phosphate of lithium ($Li_2HPO_4$) also has utility in improving the characteristics of cements of the type herein described.

All things considered, including both price of the agent and technological improvement in the magnesium oxychloride or like cement, secondary calcium phosphate ($CaHPO_4$) or its hydrate is the agent which we presently prefer to employ in our cement as made and sold. However, this statement is not to be taken as being in any way limiting and, of course, is contingent upon a number of variable factors such as prices of chemicals, certain frequently encountered conditions of use, etc.

Phosphates, especially secondary phosphates, of other alkaline earth metals, such as a barium and strontium, are likewise contemplated. Secondary copper phosphate ($CuHPO_4$) is also very satisfactory but is more expensive than secondary calcium phosphate. Additionally the copper salt tends to discolor the cement, which is disadvantageous for many purposes, though acceptable for some.

The secondary calcium phosphate or other agent employed should preferably be of small particle size, e. g. of a powdered or impalpable nature, and should preferably be uniformly mixed with and disseminated throughout the mass of the magnesium oxychloride or like cement. The acid phosphate employed is normally present in an amount by weight substantially less than that of the magnesium oxide of the oxychloride cement, or equivalent, and is usually present in an amount of the order of 1 or 2 to 10 percent by weight, based on the entire mass of cement. Expressing the proportionate quantity of the secondary phosphate salt another way, it may, for example, be present to the extent of about 5 to 50% of the weight of the MgO content of the magnesium oxychloride cement. About 2% of secondary calcium orthophosphate, based on the entire weight of the finished magnesium oxychloride cement as sold, is usually sufficient for practical purposes. On the basis of the MgO, the secondary calcium phosphate ordinarily is preferably present to the extent of 5 to 25%, e. g. 10%.

$Ca_3(PO_4)_2$ is an example of a salt of one of the higher acids of the elements in group V of the periodic table which does not impart any substantial improvement in the properties of magnesium oxychloride cements. On the other hand, if salts of much greater solubility than $CaHPO_4$, especially acid salts such as $Ca(H_2PO_4)_2$, $Mg(H_2PO_4)_2$ and $Mg(H_2AsO_4)_2$, are used, the upper limit of proportion must be carefully controlled to avoid harmful effects and, when used in such small quantities, do not benefit to an interesting degree the properties of the cement; whereas, with compounds having properties, including solubility, of the order of that of $CaHPO_4$, there does not appear to be any harmful effect and, on the contrary decided advantages, and considerable latitude is allowed in the proportions employed. Phosphoric acid, which of course is highly soluble, is, as such, definitely disadvantageous, as contrasted with relatively insoluble phosphates of Ca, Ba, Cu, etc., in that the phosphoric acid, used per se in amounts to have any significant effect on the weathering characteristics of the basic salt cement, will cause a warping of the cement; whereas it is one of the purposes of our present invention to obviate warpage as well as unwanted expansion.

While heretofore some suggestion has been made to employ alkali or ammonium phosphates such as sodium acid phosphate, not in magnesium oxychloride cements but in magnesium oxysulphate cements, despite what may be said in regard to its use with magnesium oxysulphate cement, it is noteworthy that such material, employed as suggested, is definitely deleterious in magnesium oxychloride cements, e. g. in producing excessive expansion on hardening.

The use of various phosphates, etc., of calcium, barium, aluminum, etc., for the purposes herein set forth (i. e. to improve weathering characteristics and to avoid undesirable expansion of magnesium oxychloride and like cements, which we customarily allow to set under ordinary atmospheric or room temperatures) is not to be confused with the heretofore suggested use of various materials, such as aluminum chloride, etc., for the purpose of facilitating or accelerating the harding of baked cement products.

The salt, or reagent comprising the same, employed in this invention (e. g. secondary calcium phosphate or the like) preferably should be relatively free of certain materials or impurities. Where, for example, secondary calcium phosphate is the agent to be used, one advantageous way of preparing the same is by reacting phosphoric acid with a suspension of finely divided calcium carbonate ($CaCO_3$), thus producing an advantegeous phosphate salt which is free of alkaline components or impurities which sometimes occur therein when the same is produced from lime.

The intermixing of secondary calcium phosphate, in powdered or finely divided form, with other ingredients of our magnesium oxychloride or like cement will be understood from the following illustration. Magnesium chloride, magnesium oxide, and secondary calcium phosphate, together with conventional fillers well known in the art, may be agitated and mixed together, either by hand or with any suitable mechanical device such as an ordinary rotary cement mixer.

For the sake of a specific illustration, one cement composition which is illustrative of our invention comprises a magnesium oxychloride mixture, such as the following:

| | Parts by weight |
|---|---|
| Magnesium oxide | 20 |
| Crushed sand | 80 |
| $CaHPO_4$ (secondary calcium orthophosphate) | 2 | prepared by dry mixing until the components are thoroughly dispersed and stored in the dry state or immediately converted into a paste or mortar by the addition of concentrated magnesium chloride solution. The proportion of magnesium oxide may be of the order of 20 percent of the composition and increasing the quantity of this component does not greatly increase the strength of the cement; however, for variations in resiliency an increase in the magnesium oxide content to 50% may be made while a reduction of the oxide content down to about 10% can often times be made, but as the proportion of magnesium oxide is unduly reduced, the strength of the resulting cement is decreased.

The sand content or other filler material may likewise vary in proportion or be entirely omitted from the initial mixture and be subsequently included when the powder material is mixed for direct application. This filler material may be round or crushed sand, asbestos, pigments, marble chips or other coarse aggregate which provide the desired effect.

If desired the magnesium chloride may be added as a dry powder to the other dry ingredients and water added when ready for use.

The addition of this salt is, in practice, commonly determined by the quantity of its solution, of suitable predetermined concentration, required to wet the remaining ingredients of the cementitious mixture. For example, to determine the amount necessary to wet the dry metal oxide, acid phosphate and filler, a solution of definite concentration is used to wet a small measured quantity of the dry mixture to the proper consistency for application, and from this the quantity of salt required can be calculated. Thus, the quantity of dry magnesium chloride hexahydrate needed for the specific example given hereinabove is of the order of 16 parts by weight and, when mixed with the other ingredients above illustrated, produces a dry cement material ready for use upon the addition of sufficient water to give the same a working consistency.

However, it will be understood that the above is only illustrative and that the nature and proportions of ingredients may be otherwise determined in accordance with the specific properties of the components or the requirements of the cement, uses for which it is to be employed, and the like.

While dolomite is a cheap source of magnesium oxide for use in the type of cements herein defined, it has been difficult to employ such material in accordance with the knowledge of the prior art. However, with the use of additional agents such as herein defined, e. g. CaHPO₄, CuHPO₄, etc., it is possible to employ with satisfaction the magnesium oxide derived from the calcining of dolomite, despite the presence of a large amount of calcium carbonate with the magnesium oxide. However, where dolomite is relied upon as the source of magnesia for the cements herein described, we prefer that the dolomite be calcined under specially controlled conditions. However, we are not limited to the use of calcined dolomite, nor to any particular method of calcining the same.

Magnesium oxychloride and like cement, when the same have secondary copper orthophosphate, difficulty soluble arsenates (e. g. secondary magnesium ortho arsenates) or the like, added thereto, may advantageously be employed in bathrooms, public showers, swimming pools, etc., and serve to retard or prevent the growth of fungi, etc.

The bulk of the phosphates and related salts (which excludes copper acid phosphate) hereinabove illustrated, e. g. CaHPO₄, Mg₃(PO₄)₂, etc., do not impart color to magnesium oxychloride cements, which is an important factor in respect to the use of such cements for various purposes where a white or light colored finish is desired.

An aspect of our invention involves using our improved oxychloride or like cement for coating walls, floors, swimming pools or other large areas. In this connection, where colored coatings are desired, we may employ a basic salt cement, for example a neutral colored magnesium oxychloride cement, having CaHPO₄ or the like admixed therewith, to which is added a suitable pigment or dye to give the coating or composition the desired shade or color. Among the coloring agents or pigments which may be employed are various metal compounds including such earth oxides as red iron oxide, black iron oxide, yellow ochre, chrome green ($Cr_2O_3$), and the like.

While materials mentioned herein have utility in connection with oxychloride-oxysulphate cements, they are especially contemplated for use in cements comprising mainly magnesium oxychloride or comparable oxychloride cements, with or without the usual fillers, etc.

While the present invention has been illustrated hereinabove primarily in connection with various difficulty soluble phosphates, especially secondary orthophosphates of metals such as of calcium, barium, copper and the like, it will be borne in mind that we also contemplate the use of other materials besides phosphates. Certain salts of higher acids of other elements besides phosphorus may be employed, for example certain salts of higher acids of arsenic. For example, magnesium arsenate $Mg_3(AsO_4)_2$ or its hydrate may be employed. Also various other phosphates may be employed. The normal phosphates of aluminum, magnesium and zinc, ($AlPO_4$, $Mg_3(PO_4)_2$, $Zn_3(PO_4)_2$ and $Ca(PO_3)_2$) e. g. in quantities of the order of 2 or 4 percent by weight based on the magnesium oxychloride cement, may be used for example, but are not as advantageous at the present time, all things considered, as secondary calcium orthophosphate, CaHPO₄.

While one of the important advantages of our invention is to produce a good oxychloride or like cement while avoiding the use of copper powder, which is expensive, one aspect of our invention involves using a mixture of one or more salts of higher acids of elements of group V of the periodic system, for example, secondary calcium phosphate, in admixture with relatively small amounts of copper powder. 2% by weight of copper powder plus 2% by weight of a difficultly soluble salt as above illustrated, e. g. acid phosphate such as CaHPO₄ (based on the total weight of the dry cement composition), produces a better cement than even 5% by weight of copper powder. In place of CaHPO₄ or the like, CuHPO₄, MgHAsO₄, BaHPO₄, etc., may be employed in admixture with copper or similar metallic powder. Copper, to exert its action, must corrode whereas secondary calcium orthophosphate and the like need merely dissolve to exert their controlling action on the properties of such cement. Attempts to increase the action of copper during setting by using very large amounts of copper produces undesired results, e. g. produces a cement which will undergo a continued contraction after the final set. Additionally, as will be obvious, a cement made with a mixture of secondary calcium phosphate and copper powder, 2 percent each, is much more economical than the cement made with 5% copper powder alone.

Difficultly soluble phosphates and the like, or mixtures thereof with each other, may be used in admixture with other materials besides copper powder, if desired, for example in admixture with certain other powdered metals. However, the expense of such other powdered metals, at present price levels, is so high as to make their use unattractive and/or objectionable on the same basis, among other things, that the use of large quantities of copper powder is objectionable.

An example of another useful composition, according to our invention, is as follows:

| | Parts |
|---|---|
| Magnesium oxide | 20 |
| Sand | 80 |
| Magnesium chloride hexahydrate | 16 |
| Magnesium sulphate $MgSO_4 \cdot 7H_2O$ | 2 |
| Dicalcium phosphate | 2 |

Such a composition is useful for various purposes, e. g. for the resurfacing of concrete, etc. In such composition the aggregative effect of magnesium sulphate and dicalcium phosphate is to produce a cement which is of advantageous properties. The magnesium sulphate, in the absence of dicalcium phosphate and/or equivalents, is capable of producing only a relatively limited improvement in the properties of the cement. It appears that the highly soluble magnesium sulphate may perform one of its useful functions by an immediate reaction with free lime, which may be leached from concrete or like surfaces to which the cement may be applied. Such cement may, of course, also be applied to surfaces containing no free lime.

Whether the difficultly soluble phosphates, and other like salts, hereinabove mentioned, function so favorably in magnesium oxychloride and like cements mainly because they may act to produce a more stable form of magnesium oxychloride cement, and/or because they may combine with the soluble calcium (always present to some extent in commercial magnesium oxychloride cement) to convert the same into insoluble form, and/or because of still other reasons is primarily a matter of theory and the scope of this invention is not to be restricted by any theory of operation. The fact that $CaHPO_4$ may, and likely does, act by slow, continuing solution of the difficultly soluble phosphat particles, especially during the period of hardening of the wet cement, may be significant but is not limitative. The special utility and advantages as hereinabove defined, of secondary calcium phosphate, copper phosphate ($CuHPO_4$), etc., and mixtures thereof with copper and like powdered metals, when used in magnesium oxychloride and like cement compositions are, of course, not limited by a possible lack of or a possibly inexact understanding of their theory of operation. All variations and embodiments within the scope of the appended claims are contemplated.

Where herein or in the appended claims we state that our novel magnesium oxychloride cements do not expand or change volume to any substantial extent during setting and, after setting, will not undergo any substantial diminution in volume with the elapse of time, we mean that the linear expansion of contraction of said cements will be of the order of .006 inch per foot, or less.

What we claim is:

1. A cementitious composition adapted to set at room temperatures comprising a magnesia cement including magnesium oxychloride and, in intimate admixture therewith, an amount by weight substantially less than that of said magnesia cement of at least one of the divalent metal salts from the group consisting of: $Mg_3(PO_4)_2$, $Zn_3(PO_4)_2$, $Ca(PO_3)_2$, $Mg_3(AsO_4)_2$, $MgHAsO_4$ and $MgHPO_4$.

2. A cementitious material in the unset state comprising a magnesium oxychloride cement containing a mixture of a phosphate of a divalent metal and a small amount of powdered copper, said mixture being present in an amount by weight substantially less than that of the said magnesium oxychloride cement and being substantially uniformly mixed with the latter.

3. A cementitious material in the unset state comprising a magnesium oxychloride cement containing an arsenate of magnesium, said arsenate having a solubility therein, in the wet state, approximating that of secondary calcium phosphate, said arsenate being present in an amount by weight substantially less than that of said magnesium oxychloride cement.

4. A cementitious material possessing improved characteristics comprising a magnesium oxychloride cement containing $MgHAsO_4$ and a small amount of powdered copper, said $MgHAsO_4$ being present to the extent by weight of 1 to 10% of that of said magnesium oxychloride cement.

5. A cementitious material possessing good weather resistance and being resistant to expansion during setting and also resistant to gradual contraction with the elapse of time after setting, said cementitious material comprising magnesium oxychloride cement in which the $MgCl_2$ is present in substantial but lesser weight proportion than the MgO content of the cement, and, in intimate admixture therewith, secondary calcium ortho phosphate, said phosphate being present in finely divided form and in an amount by weight of 5 to 25% of the weight of said MgO.

6. A cementitious material possessing improved characteristics comprising a magnesium oxychloride cement containing $MgHAsO_4$, said $MgHAsO_4$ being present to the extent by weight of 1 to 10% of that of said magnesium oxychloride cement.

7. A cementitious material possessing improved characteristics comprising a magnesium oxychloride cement containing $CaHPO_4$ and a small amount of powdered copper, said $CaHPO_4$ being present to the extent by weight of 1 to 10% of that of said magnesium oxychloride cement.

8. A cementitious material possessing improved characteristics comprising a magnesium oxychloride cement containing $CaHPO_4$, said $CaHPO_4$ being present to the extent by weight of 1 to 10% of that of said magnesium oxychloride cement.

9. A cementitious material in the unset state comprising a magnesium oxychloride cement containing a phosphate salt of a divalent metal having a solubility therein, in the wet state, approximating that of secondary calcium phosphate, said phosphate salt being present to the extent by weight of 1 to 10% of that of said magnesium oxychloride cement.

10. A cementitious material in the unset state comprising a magnesium oxychloride cement containing a secondary phosphate salt of a divalent metal, said phosphate salt being present to the extent by weight of 1 to 10% of that of said magnesium oxychloride cement.

11. A cementitious composition adapted to set at room temperatures comprising a magnesia cement including magnesium oxychloride and, in intimate admixture therewith, an amount by weight substantially less than that of said magnesia cement of at least one secondary phosphate salt of a divalent metal.

WILLIAM E. SOHL.
HENRY N. STEPHENS.